J. F. MILLER.
SWEET POTATO VINE CLIPPER.
APPLICATION FILED APR. 17, 1912.
1,040,234.
Patented Oct. 1, 1912.
2 SHEETS—SHEET 2.
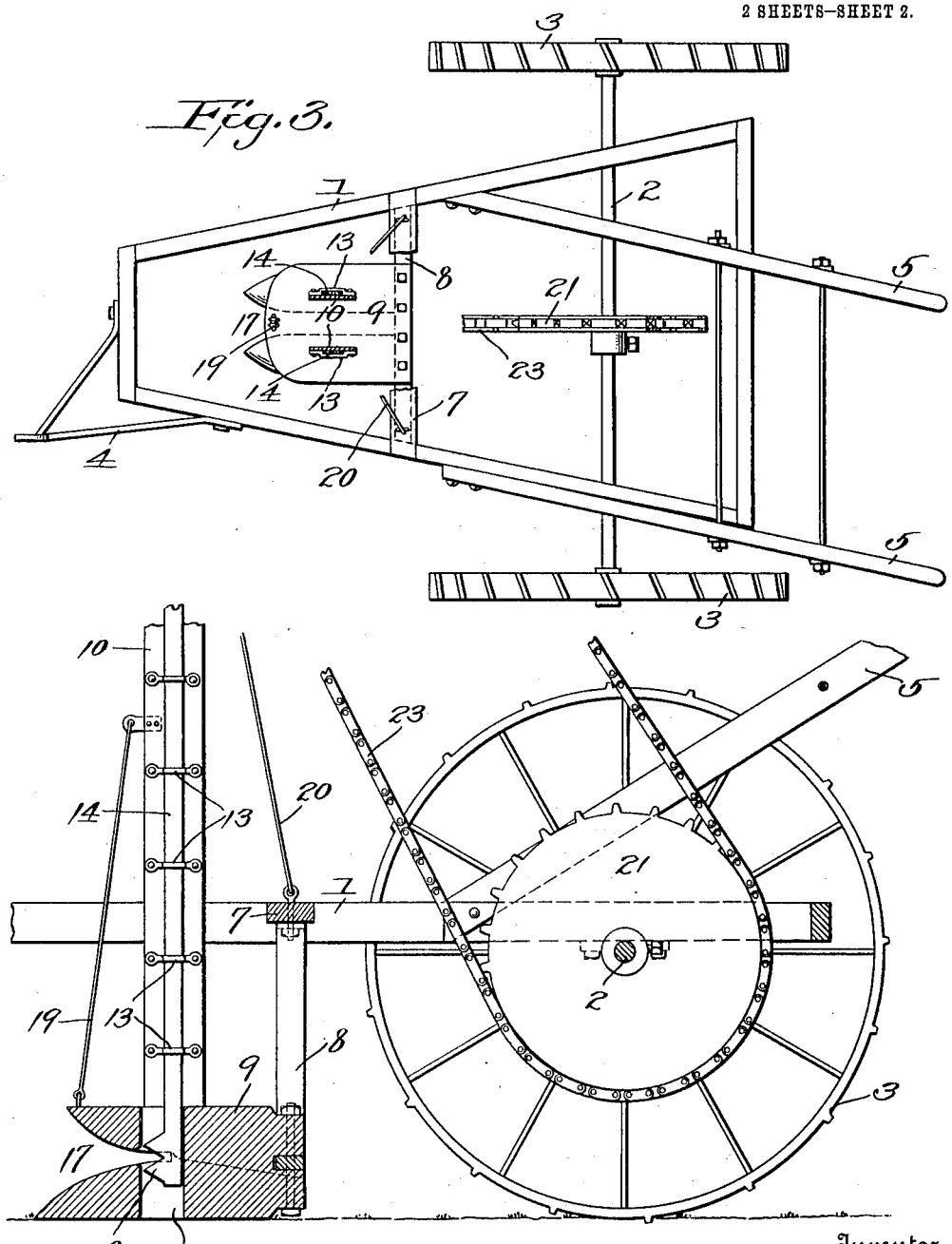

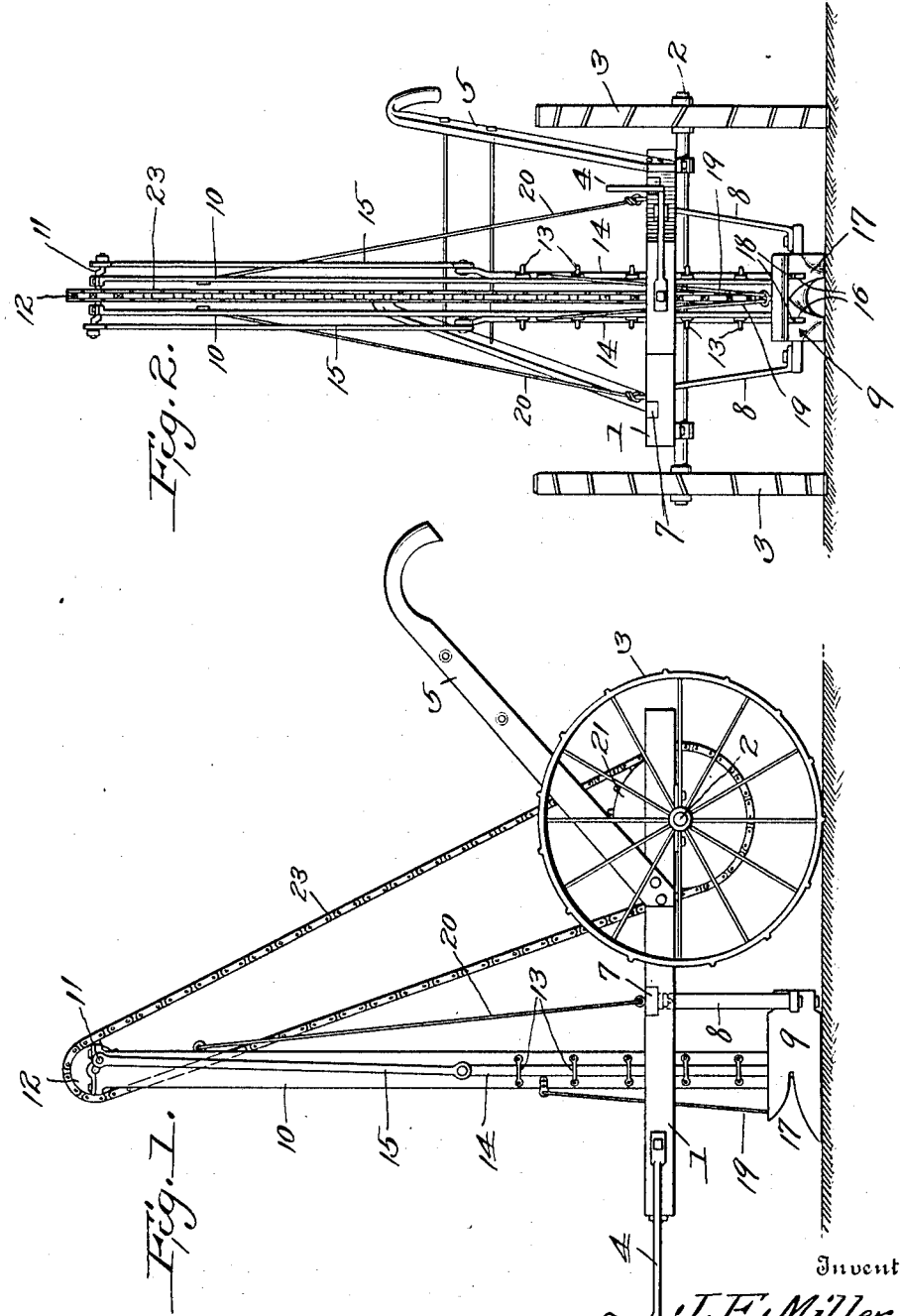

UNITED STATES PATENT OFFICE.

JAMES FRANKLIN MILLER, OF GOLDSBORO, NORTH CAROLINA.

SWEET-POTATO-VINE CLIPPER.

1,040,234. Specification of Letters Patent. Patented Oct. 1, 1912.

Application filed April 17, 1912. Serial No. 691,272.

*To all whom it may concern:*

Be it known that I, JAMES F. MILLER, a citizen of the United States, residing at Goldsboro, in the county of Wayne and State of North Carolina, have invented a new and useful Improvement in Sweet-Potato-Vine Clippers, of which the following is a specification.

This invention relates to a device for cutting potato vines prior to digging.

I am aware that a number of devices in the way of stalk and vine cutters have been constructed, but in all devices of this kind known to me the object has been to cut upright grown plants and the cutters have worked horizontally. Sweet potato vines owing to their trailing habit and the close mat which they form upon the ground cannot be successfully cut by devices constructed similar to these usually employed in cutting beet tops, or other plants having a more or less upright habit of growth. In order to cut the potato vines it is necessary to first lift the vine from the ground and then to cut the same by a cutter operating in a vertical plane.

The invention therefore consists of a device provided with a shoe adapted to move along the ground in a horizontal plane and to engage and successively cut the vines as the shoe lifts them.

The preferred form of the invention is hereinafter described, pointed out in the claims and shown in the accompanying drawings, in which, Figure 1 is a side elevation of the device. Fig. 2 is a front elevation. Fig. 3 is a top plan view, the parts being in section. Fig. 4 is an enlarged side elevation, partly in section of the lower portion of the machine, the shoe being shown in longitudinal vertical section.

In constructing the device a number of forms of support for the cutting mechanism are possible and it is also possible to provide any one of a number of well known transmission devices for the purpose of imparting to the cutter bars the necessary reciprocating movement. In the drawings, however, I have shown a frame 1 having a greater width at the rear than at the front said frame carrying adjacent its rear end an axle 2 upon which are mounted supporting and drive wheels 3. In order that the horse and operator may both walk between the ridges in which the potatoes are planted, while the cutting mechanism travels along said ridges a draft attachment 4 is connected to the front and one side of the frame 1 and rearwardly extending handles 5 are carried by the sides of the rear portion of the frame, said handles being arranged obliquely with respect to the longitudinal axis of the frame 1, thereby enabling the operator to grasp both handles and at the same time walk in the furrow adjacent to the ridge over which the cutting mechanism travels.

Mounted upon the frame 1 is a cross bar 7, from which hangs a depending frame 8 to the lower portion of which is secured a pick-up shoe 9. Mounted upon the shoe is an upright frame consisting of parallel plates 10 at the upper end of which is mounted a crank shaft 11 and upon said shaft and between the plates is a sprocket wheel 12. Working upon the outer faces of these plates and through suitable guide brackets 13 are cutter bars 14, said cutter bars being connected to the shaft 11 by means of pivoted links 15. The shoe 9 is provided with two vertical openings 16 and is also slotted in a horizontal plane at its front end, as shown at 17. The slot 17 has curved upper and lower inwardly converging walls, and said slot communicates with each of the vertical slots 16. That portion of the cutter bar 14 which reciprocates in the slot 16 is provided with cutting teeth 18. A suitable brace rod 19 runs from the shoe to the frame consisting of the plates 10, and these plates are also braced from the cross piece 7 by means of brace rods 20. A sprocket chain 23 runs over the sprocket 21 and also over the sprocket wheel 12, thereby reciprocating the cutter bars 14.

It will be noted that the shaft 11 has its end portions oppositely cranked so that the bars 14 will alternate in their cutting movements. As the device is run along the rows, the vines will be picked up by the mouth of the shoe formed by the slots 17 and will be carried into the slots 16 where they will be cut by the teeth of the bars 14.

What I claim is:—

1. A vine cutter comprising a shoe provided with parallel vertical slots, oppositely acting cutter bars working vertically in said slots, said shoe having a horizontal slot communicating with both of said vertical slots.

2. In a potato vine cutter, a shoe provided with vertical slots, and having at its front end a horizontal slot the upper and lower walls of which are rearwardly converging, the rear end of said horizontal slot bisecting the vertical slots and vertically movable cutter bars working in said vertical slots.

3. A vine cutter consisting of a shoe, said shoe being horizontally slotted to receive the vines, cutter bars working vertically through said shoe and transversely across the inner end portion of said slot, and means for moving said cutter bars in opposite directions relative to each other.

JAMES FRANKLIN MILLER.

Witnesses:
A. A. MILLER,
PITTMAN BRAY.

Copies of this patent may be obtained for five cents each, by addressing the "Commissioner of Patents, Washington, D. C."